Sept. 15, 1953   J. A. JONES   2,652,270
COUPLING
Filed Nov. 18, 1949                                   2 Sheets-Sheet 1

INVENTOR.
JOHN A. JONES
BY

Sept. 15, 1953

J. A. JONES 2,652,270

COUPLING

Filed Nov. 18, 1949

INVENTOR.
JOHN A. JONES
BY

Patented Sept. 15, 1953

2,652,270

UNITED STATES PATENT OFFICE 2,652,270

COUPLING

John A. Jones, Baltimore, Md.

Application November 18, 1949, Serial No. 128,212

2 Claims. (Cl. 287—52)

The present invention relates to a shaft coupling or gripping element for collars, pulleys, gearing and similar members. The collar is a modified form of the coupling shown in my prior application, Serial No. 108,599, now Patent No. 2,638,365.

The primary object of the present invention is to provide a clamping type coupling having a maximum clamping area.

Another object of the invention is to provide a coupling which will have means for providing a more even clamping action upon the shaft.

Still another object of the invention is to provide a clamping means which will cause a minimum of damage to the shaft.

While several objects of the invention have been specifically set forth, other objects, uses, and advantages of the invention will be more apparent as the nature of the invention is more fully disclosed, which includes the novel construction, combination and arrangement of parts, as illustrated in the accompanying drawings and described in the following detailed description in which.

The term coupling is used in its broadest sense to indicate a collar or member for holding an element in fixed position upon a shaft such as a gear, pulley, or the like. It is also intended to include any type of coupling element used in connecting the ends of cylindrical shafts, machine parts, and similar elements.

Referring more in particular to the construction of the coupling, reference is first made to the preferred form shown in Figures 1 to 6 inclusive. The coupling is provided with a housing, or casing, which consists of a central tubular body member 12 and two end members 14 and 16 which are fixedly secured into each end of the member 12. The end members 14 and 16 are provided with apertures 14' and 16' adapted to fit snugly about a shaft of predetermined dimensions, thus forming an internal cylindrical recess along the central body section between the end members.

Figure 1:
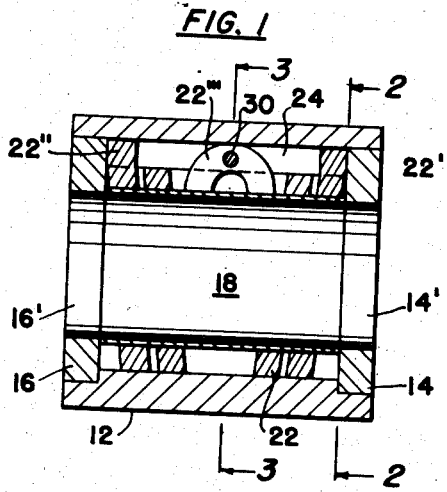
Figure 1 is a longitudinal sectional view of the collar.
Figure 2:
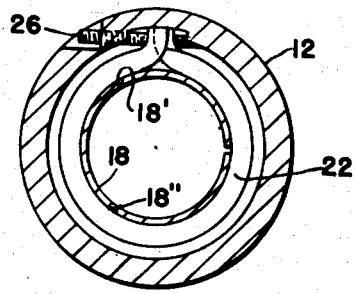
Figure 2 is a sectional view taken along the line 2—2 of Figure 1.
Figure 3:
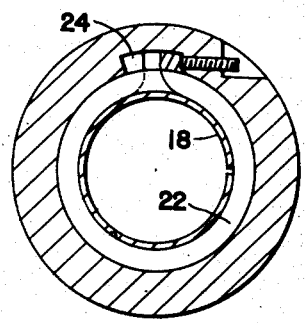
Figure 3 is a sectional view taken along the line 3—3 of Figure 1.
Figure 5:
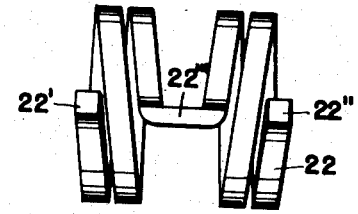
Figure 5 is a view in elevation of one form of one of the gripping elements.
Figure 4:
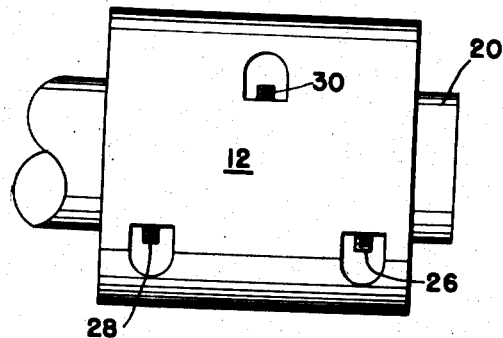
Figure 4 is an elevational plan view.
Figure 6:
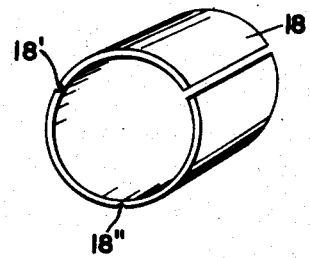
Figure 6 is a view in perspective of the shaft sleeve gripping element.
Figure 7:
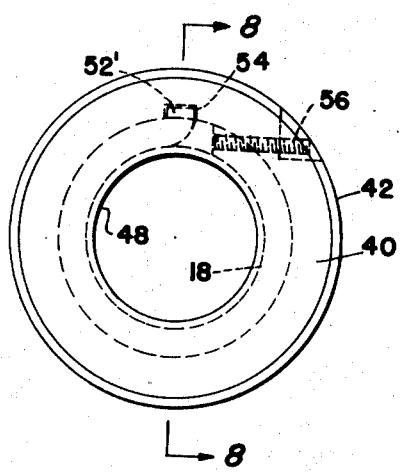
Figure 7 is an end view of a modified form of coupling.
Figure 8:
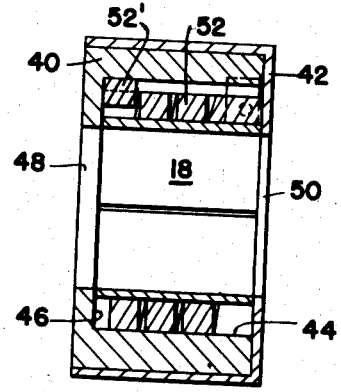
Figure 8 is a sectional view on the line 8—8 of Figure 7.

Fitted between the end members is a split sleeve 18 which is normally slightly larger than the apertures 14' and 16' and slidable over the shaft as shown at 20 in Figure 4. The sleeve is adapted to fit snugly between the end members to prevent any end play of the coupling when the sleeve is clamped to the shaft.

Spiraled about the sleeve 18 and positioned between the sleeve and the inner surface of the central cylindrical tubular member 12, is a reversed coil 22 of suitable material, preferably constructed of a spring steel, which normally fits loosely about the sleeve 18. The spiraled coil is made of a single piece and spiraled in opposite directions from its center. The ends 22' and 22'' and the center portion 22''' are turned outwardly to engage a slot or groove 24 which runs longitudinally of the member 12. The slot is substantially wider than the thickness of the gripping spiral member 22 in order that the ends may be moved transversely thereof. At each end of the slot and opposite the outward ends 22' and 22'' are set screws 26 and 28 for moving the ends 22' and 22'' transversely of the slot and in the same direction. Adjacent the center of the spiral is a set-screw 30 which is adapted to contact the outwardly turned portion 22''' for moving the central section of the spiral in the opposite direction across the slot.

As stated hereinbefore, the sleeve 18 is split and is also provided with grooves 18' and 18'' in order to give the sleeve flexibility. The sleeve may be made of any suitable material or may be made up of several materials which would be best adapted for the particular holding action.

In operation, the set-screws are retracted allowing the spiraled member 22 and the sleeve 18 to expand to their normal position; the coupling is then slipped over the shaft to the desired location and the set-screws tightened. The end set-screws 26 and 28 will move the ends of the coil in one direction, and the set-screw 30 will move the center section of the coil in the opposite direction. This causes the diameter of the spiral to be reduced, compressing the sleeve and causing it to yield inwardly and grip the shaft, fixing the coupling or other elements to which the coupling is attached, or secured, to the shaft.

A modified form of the coupling is shown in Figures 7 to 10, inclusive. This form comprises a housing, or casing, which is made up of a main, or supporting, body portion 40 and a retaining cover portion 42. The member 40 is protaining cover portion 42. The member 40 is provided with a cylindrical recess 44 and a shoulder portion 46 for receiving the shaft clamping means. The shoulder portion has an opening 48 for receiving the shaft. The cover 42 is adapted to be tightly fitted over the member 40 by pressing, clamping, or in any suitable manner. The cover is provided with an opening 50 corresponding with the opening 48 for positioning the opposite side of the coupling upon the shaft. The shaft openings are adapted to fit the shaft snugly with a minimum amount of tolerance in order to carry the coupling evenly upon the shaft.

Figure 9:
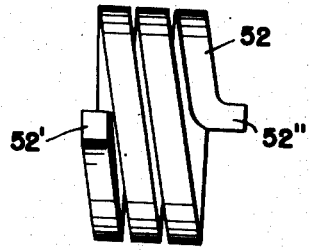
Figure 9 is a plan view in elevation of the modified form of gripping element.
Figure 10:
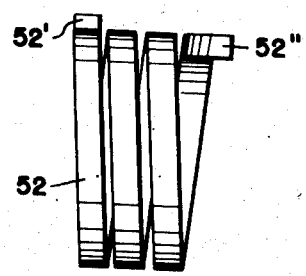
Figure 10 is a view taken at right angles of the gripping element shown in Figure 9.

The clamping, or gripping, means consists of an element 52 and the sleeve 18, which has already been described in the preferred form. In this form the spiral coiled member 52 is of a single direction type having one end 52' turned outwardly to engage a slot, or groove, 54 within the housing member 40, while the opposite end 52" of the spiral is turned at right angles and horizontally to the path of the coil and is adapted to be engaged by a threaded set-screw 56 in the direction of the spiral as shown in Figure 9, the set-screw being threadably receivable within an appropriate aperture within the housing.

The sleeve 18 is adapted to fit closely between the shoulder 48 and the cover 42 adjacent their respective openings 48 and 50. The sleeve is normally slightly larger than the openings for allowing the shaft to be passed through the coupling. The spiral member 52 is of such dimension as to lie between the inner surface of the central cylindrical member 40 and the outer surface of the sleeve, its normal position being such as to allow the sleeve to expand to a point where the shaft may be inserted.

When assembled, the outwardly turned end 52' of the coil is located within the slot 54 and is fixedly held in this position. The opposite end 52" of the coil is directly in the path of the set screw 56. When the collar is inserted over the shaft and in position, the set-screw is tightened which causes the diameter of the coil to be reduced, compressing the sleeve about the shaft.

The coupling is adapted for use where the use of set-screw and key-ways in a shaft is objectionable, or where adjustments of the coupling in relation to the shaft are necessary. These adjustments may be made with the present coupling without complicated adjusting means, or the necessity of scoring the shaft by numerous markings and disfiguring of the shaft by the setscrews.

Figure 11:
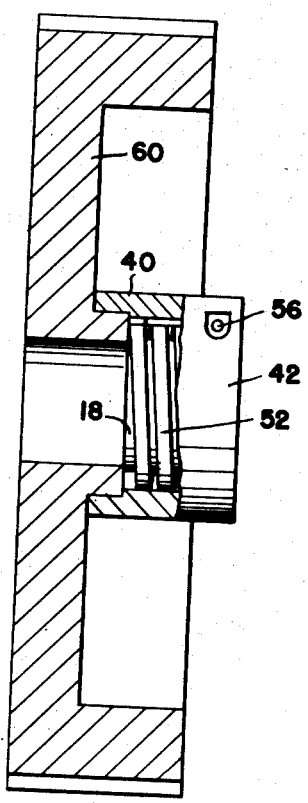
Figure 11 is a view partly in section and partly in elevation showing an application of the collar to a driving element.

Either form of collar may be attached, or be constructed as a part of a driving or driven element such as a gear 60 as shown in Figure 11, or any other machine part which may be secured to a cylindrical surface.

The invention may have other applications which have not been specifically mentioned herein; however, it is to be contemplated that various changes may be made without departing from the spirit of the invention. Therefore, the scope of the invention will be best defined in the appending claims.

I claim:
1. A device of the character described for engaging the cylindrical outer surface of a shaft, comprising, a continuous housing having an intermediate body section and two end sections, said housing having a continuous opening extending through the intermediate body section and the two end sections, the openings in the end sections of the housing being of cylindrical form and along the same axis as the opening in the intermediate section, the end section openings being of such size as to slidably receive a cylindrical shaft of a predetermined size, the opening through the intermediate body section being of a larger diameter than the openings in the end sections, a cylindrical elastic sleeve having its normal inner diameter of substantially the same size as the cylindrical openings in the end sections and mounted within the opening of the intermediate section and extending between the inner wall surfaces of the end sections, and in line with the end openings, a helical spring member located within the opening of the intermediate section and circumposed about the sleeve, having its normal inner diameter of substantially the same size as the normal outer diameter of the sleeve, means supported upon the housing for moving at least one end of the helical spring member around the outer surface of the sleeve relative to the remainder of the said member, whereby, the diameter of the helical spring member is reduced pressing the elastic sleeve in holding engagement with the shaft.

2. A device of the character described for engaging the cylindrical outer surface of a shaft, comprising, a continuous housing having an intermediate body section and two end sections, said housing having a continuous opening extending through the intermediate body section and the two end sections, the openings in the end sections of the housing being of cylindrical form and along the same axis as the opening in the intermediate section, the end section openings being of such size as to slidably receive a cylindrical shaft of a predetermined size, the opening through the intermediate body section being of a larger diameter than the openings in the end sections, a cylindrical elastic sleeve having its normal inner diameter of substantially the same size as the cylindrical openings in the end sections and mounted within the opening of the body section and extending between the inner wall surfaces of the end sections, and in line with the end openings, a helical spring member located within the body opening and circumposed about the sleeve, having its normal inner diameter of substantially the same size as the outer normal diameter of the sleeve and extending in opposite directions from a point along its length, means supported upon the housing for moving the ends of the helical spring member around the outer surface of the sleeve relative to the said point along its length, whereby, the diameter of the helical spring member is reduced pressing the elastic sleeve in holding engagement with the shaft.

JOHN A. JONES.

References Cited in the file of this patent
UNITED STATES PATENTS

| Number | Name | Date |
|---|---|---|
| 536,121 | Bache | Mar. 19, 1895 |
| 701,018 | Diescher | May 27, 1902 |
| 876,052 | Haskins | Jan. 7, 1908 |